United States Patent
Nisley et al.

(10) Patent No.: US 7,305,767 B2
(45) Date of Patent: *Dec. 11, 2007

(54) SHAFT AND HUB MOUNTING SYSTEM AND METHOD

(75) Inventors: Donald L. Nisley, Greenville, SC (US); James E. Mickelson, Simpsonville, SC (US); Roman M. Wajda, Greer, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 528 days.

This patent is subject to a terminal disclaimer.

(21) Appl. No.: 10/900,247

(22) Filed: Jul. 27, 2004

(65) Prior Publication Data

US 2004/0261269 A1    Dec. 30, 2004

Related U.S. Application Data

(63) Continuation-in-part of application No. 09/938,888, filed on Aug. 24, 2001, now Pat. No. 6,939,053.

(51) Int. Cl.
*F16C 27/04* (2006.01)

(52) U.S. Cl. .................... 29/898.08; 29/898.07; 29/894.361; 403/1; 403/DIG. 8; 403/314; 403/374.4

(58) Field of Classification Search ........... 29/898.08, 29/898.07, 894.361; 384/538; 403/1, DIG. 8, 403/314, 374.4
See application file for complete search history.

(56) References Cited

U.S. PATENT DOCUMENTS 208,965 A * 10/1878 Crowell ................ 403/314

| | | |
|---|---|---|
| 738,445 A | 9/1903 | Hoffmann ............... 384/540 |
| 851,419 A | 4/1907 | Hess ...................... 384/538 |
| 876,052 A | 1/1908 | Haskins |

(Continued)

FOREIGN PATENT DOCUMENTS

DE    4107864    9/1992

(Continued)

OTHER PUBLICATIONS

Rockwell Automation Introduces New DODGE® GRIP TIGHT™ Adapter Ball Bearing, Greenville, SC, Dec. 11, 2002.

(Continued)

*Primary Examiner*—David P. Bryant
*Assistant Examiner*—Alexander P Taousakis
(74) *Attorney, Agent, or Firm*—Thompson Coburn LLP

(57) ABSTRACT

A system is provided for securing a rotating member with respect to a non-rotating member. A hollow member, such as a mounting hub or an inner ring of a bearing assembly, includes an extension having an annular outer groove. One or more tapered sleeves serve to lock the hollow member about a mechanical component, such as a shaft. A nut engageable on a sleeve includes an eccentric front aperture adjacent to a concentric groove, thereby forming a lip of varying depth The system is engaged by rotation of the nut on the sleeve in one direction, and disassembled by counterrotation of the nut such that a portion of the varying depth lip co-acts with a lip formed by a groove on an outer sleeve or on the hollow member.

32 Claims, 4 Drawing Sheets

U.S. PATENT DOCUMENTS

| | | | | |
|---|---|---|---|---|
| 1,561,443 A | | 11/1925 | Searles | 384/542 |
| 2,038,121 A | * | 4/1936 | Miller | 403/6 |
| 2,519,927 A | | 8/1950 | Pedu, Jr. | 301/5.7 |
| 2,584,740 A | | 2/1952 | Reynolds | 403/350 |
| 2,728,616 A | | 12/1955 | Potter | 384/484 |
| 2,740,676 A | | 4/1956 | Potter | 384/537 |
| 3,007,753 A | | 11/1961 | Potter | |
| 3,036,872 A | | 5/1962 | King, Jr. et al. | 384/537 |
| 3,239,292 A | | 3/1966 | Howe, Jr. et al. | 384/541 |
| 3,368,834 A | | 2/1968 | Stratienko | |
| 3,476,415 A | | 11/1969 | Van Note, Jr. | |
| 3,521,342 A | | 7/1970 | Van Dorn et al. | 29/898.067 |
| 3,918,779 A | * | 11/1975 | Halliger et al. | 384/538 |
| 3,924,957 A | | 12/1975 | Camosso | 403/352 |
| 3,953,142 A | * | 4/1976 | Price et al. | 403/371 |
| 4,164,063 A | | 8/1979 | Cenko et al. | 419/28 |
| 4,345,851 A | | 8/1982 | Soussloff | |
| 4,615,640 A | | 10/1986 | Hosokawa | |
| 4,906,124 A | | 3/1990 | Hougue | |
| 5,011,306 A | | 4/1991 | Martinie | 384/585 |
| 5,474,403 A | | 12/1995 | Hetrich | |
| 5,489,156 A | | 2/1996 | Martinie | 384/538 |
| 5,678,949 A | * | 10/1997 | Swinley | 403/362 |
| 5,685,650 A | | 11/1997 | Martinie et al. | 384/538 |
| 5,709,483 A | | 1/1998 | Martinie | 384/538 |
| 5,897,214 A | | 4/1999 | Nisley | 384/537 |
| 6,893,160 B2 | * | 5/2005 | Casey | 384/538 |
| 6,939,053 B2 | * | 9/2005 | Nisley et al. | 384/538 |

FOREIGN PATENT DOCUMENTS

| | | |
|---|---|---|
| DE | 4107864 | 12/1993 |
| JP | 05026247 | 2/1993 |
| RU | 1810630 | 4/1993 |

OTHER PUBLICATIONS

U.S. Appl. No. 10/847,002, Nisley et al.

* cited by examiner

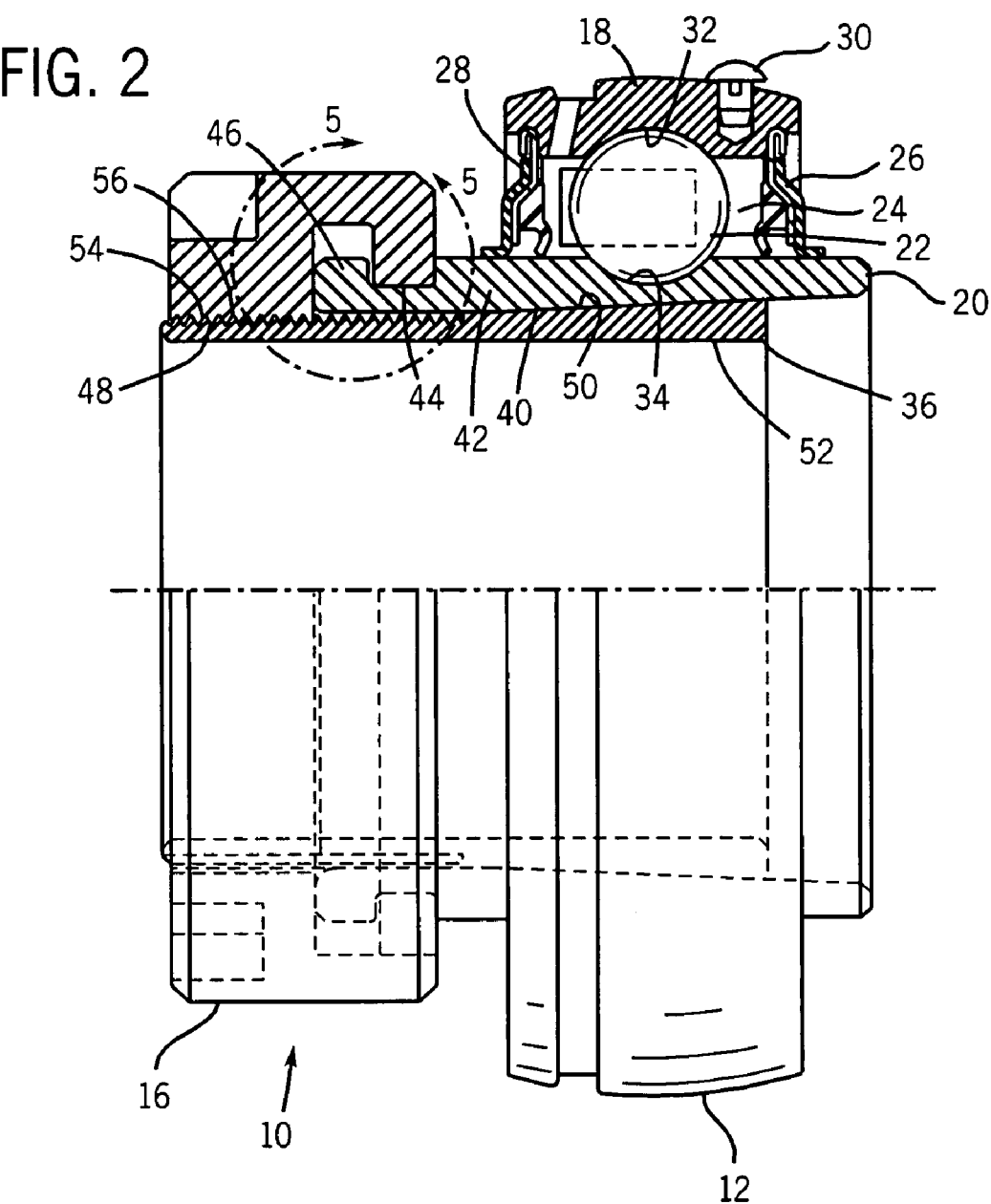
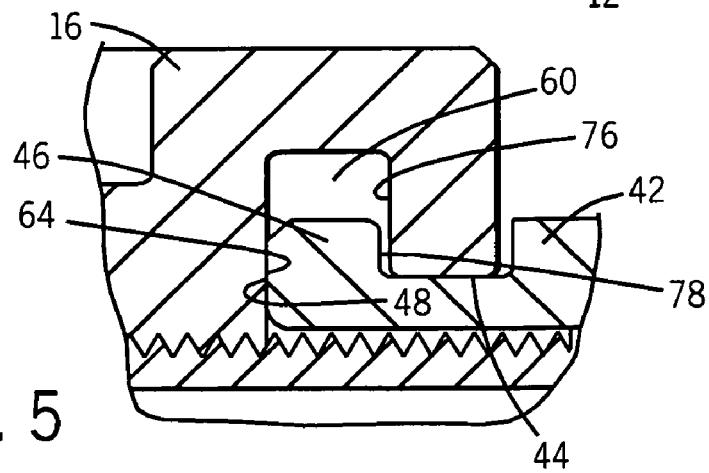

SHAFT AND HUB MOUNTING SYSTEM AND METHOD

CROSS REFERENCE TO RELATED APPLICATIONS

This application is a Continuation-In-Part of U.S. patent application Ser. No. 09/938,888, entitled "SYSTEM AND METHOD FOR MOUNTING A SHAFT WITHIN A HOLLOW MEMBER", filed Aug. 24, 2001, now U.S. Pat. No. 6,939,053 which is herein incorporated by reference.

BACKGROUND

The present invention relates generally to the field of rotating machinery, and more particularly to arrangements for securing a shaft or similar rotating member in a hollow support member, such as a bearing assembly, outer hub assembly, or mounting hub.

A wide range of rotating machinery is known and currently in use in industrial and other applications. In many such applications shafts (or inner hubs) are supported for rotation within hollow members, such as bearings, outer or mounting hubs, and other mechanical supports. The shaft may be driven in rotation by a prime mover, such as an electric motor or engine, or may be linked to various power transmission elements such as chain drives, belt drives, transmissions, pulleys, and so forth. In all such applications mounting structures are typically required to support the rotating and nor-rotating members with respect to one another in the manner sufficient to resist loading, while still allowing for free rotation of the rotating members.

When mounting rotating elements on or within bearings and hubs, several key considerations generally come into play. For example, the bearing, hub, and associated coupling or mounting structures must be capable of withstanding the anticipated loads of the application. Moreover, the mounting structures should allow for the desired balancing or centering of loads within or about the bearing assemblies and hub configurations. Also, the mounting arrangements should prevent premature wear or configurations. Also, the mounting arrangements should prevent premature wear or fretting of the shaft or other mounting components, and thus provide for a maximum life in normal use. The arrangements should also permit use of hollow members having non-tapered (i.e., cylindrical inner diameters or bores) if desired to permit use, for example, of lower-cost and standard off-the-shelf bearing assemblies and mounting hubs. Finally, the mounting structures would ideally be relatively straightforward in application, permitting the shaft (or inner hub) with bearing assemblies or outer hub configurations to be installed without undue expense, both in terms of time and parts. The latter concern extends to dismounting or disassembling the various components for servicing and replacement when necessary.

Mounting structures have been developed that address these concerns adequately, although further improvement is necessary. For example, various tapered locking structures have been developed that force tapered members between a shaft and a mounting hub or bearing. A wide range of structures have been developed for forcing one or more tapered sleeves, for example, into engagement between a hollow member and a shaft. Such structures provide good mechanical support and allow for tight engagement of the hollow member and shaft. However, disassembly of such structures is often problematic, sometimes resulting in damage or destruction of a bearing assembly, a tapered sleeve, or other mechanical components of the system. In certain known arrangements the mounting components are also relatively expensive to manufacture and can be difficult to assembly and disassemble.

There is a need, therefore, for an improved system for mounting a shaft or similar mechanical component within a hollow member. There is a particular need for a straightforward and reliable system for mounting rotating elements, such as shafts, within bearing assemblies and hub configurations.

SUMMARY OF THE INVENTION

The present invention provides a novel technique for supporting a rotating member with respect to a non-rotating member designed to respond to such needs. While the system is described herein as applied to a hollow member in which a shaft is mounted, the invention extends to mounting of shafts, hubs, and other mechanical elements as well. Similarly, the invention is particularly well suited to mounting of shafts, hubs and other rotating elements within bearing assemblies or mounting hub configurations. However, the invention might find application in the mounting of stationary members centrally, with a bearing or other rotating or non-rotating element about the central member.

In one embodiment, the system makes use of a tapered locking arrangement in which tapered surfaces of a hollow member and of a sleeve interface with one another to allow the various components to enter into tight engagement during assembly. A locking member or nut is secured to the tapered sleeve to draw the tapered sleeve into tight engagement between the hollow member and the inner mechanical member, typically a shaft. The nut is configured with an eccentric aperture forming a groove and lip having a varying depth. The eccentric aperture permits the nut or locking member to be installed on the hollow member, such as an inner ring of a bearing assembly. Engagement of the nut on a threaded portion of the tapered sleeve centers the nut and allows the nut to be tightened to draw the assembly into tight engagement. For disassembly, the nut is rotated in an opposite direction to force the lip bordering the varying depth groove into engagement with corresponding surface of the hollow member, and thereby to force the tapered sleeve out of engagement, freeing the various components from one another.

In another embodiment, the locking arrangement employs two tapered sleeves to permit use of a non-tapered hollow member. For instance, the tapered sleeve discussed above may be configured as an inner sleeve that mounts against a second sleeve, a tapered outer sleeve. Thus, in this example, the locking arrangement makes use of an interface between non-tapered surfaces of a hollow member and the outer sleeve in combination with an interface of the tapered surfaces of the outer sleeve and inner sleeve. The locking member or nut is secured on the threaded portion of the inner sleeve to draw the components into tight engagement. For disassembly, the nut is rotated in the opposite direction to force the inner sleeve out of engagement, freeing the components.

BRIEF DESCRIPTION OF THE DRAWINGS

The foregoing and other advantages of the invention will become apparent upon reading the following detailed description and upon reference to the drawings in which:

FIG. 2 is a partial sectional view of the system of FIG. 1, illustrating the engagement of the various components with respect to one another;

FIG. 5 is a detail view of interfacing surfaces of the nut and hollow member as illustrated in FIG. 2;

DETAILED DESCRIPTION

Figure 1:
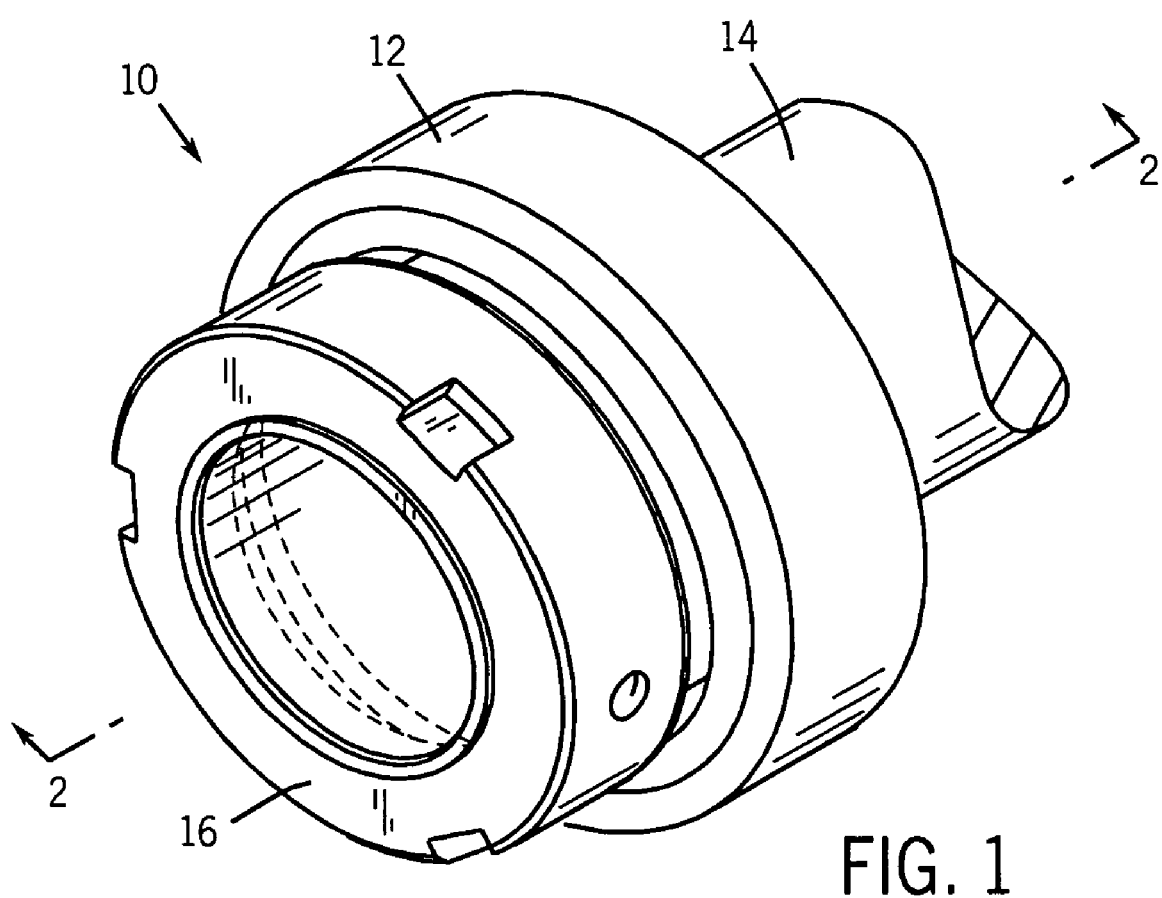
FIG. 1 is a perspective view of a mounting system in accordance with aspects of the present technique, illustrated as installed between a bearing and shaft.

Turning now to the drawings, and referring first to FIG. 1, a mounting system 10 is illustrated generally for securing a mechanical member within a hollow member. In the application illustrated in FIG. 1, the hollow member is part of a bearing assembly 12 secured on a shaft 14. As will be appreciated by those skilled in the art, many such applications exist, typically for rotating machinery and power transmission applications. As noted above, it should be borne in mind that the system described herein may be applied in various settings, including for rotating and non-rotating applications. Moreover, while a shaft is shown and described herein, various types of mechanical elements may be employed with the present system, such as hubs, various support extensions, gearing, pinions, and so forth. Similarly, while as described herein bearing 12 supports shaft 14 in rotation, in other applications, the central member, such as shaft 14 may be stationary with the bearing supporting other elements in rotation, such as in pulleys, conveyers and the like. As described in greater detail below, a nut 16 of system 10 serves to tightly engage the bearing assembly 12 and shaft 14 with respect to one another, while permitting straightforward assembly and disassembly of the system with minimal strain and unwanted loading to the bearing, shaft, and associated components.

System 10 is illustrated in greater detail in FIG. 2. As shown in FIG. 2, in the exemplary embodiment illustrated the system is applied to a bearing assembly 12 consisting of an outer ring 18, an inner ring 20, and bearing elements 22 disposed therebetween. Outer ring 18 and inner ring 20 bound an inner volume 24 in which the bearing elements 22 are disposed. Where desired, lubricants, such as grease can be provided within the inner volume and retained by seal assemblies 26 and 28 on either side of the bearing assembly. Various other components and elements may be provided in a typical bearing assembly, such as an antirotation pin 30. As will be appreciated by those skilled in the art, bearing assembly 12 would typically be mounted within one of a variety of housing styles depending upon the mechanical configuration of the application, the anticipated loading, and so forth.

The particular configurations of the inner and outer rings of the bearing assembly facilitate operation of the bearing assembly and its interfacing with mounting structures. In the illustrated embodiment, outer ring 18 forms an outer race 32, while inner ring 20 forms and inner race 34 on which the bearing elements 22 bear. As described in greater detail below, for the present purposes, inner race 34 serves as a hollow member in which the shaft (shown in FIG. 1) is mounted. A tapered sleeve 36 is fitted within the inner ring 20. To interface with the tapered sleeve 36, inner ring 20 has a tapered inner surface 40 inclined in a converging direction from right to left in the embodiment illustrated in FIG. 2. An extension 42 of the inner ring includes an outer annular groove 44 bounded by an annular lip 46. Lip 46 lies adjacent to a distal or end face 48 of the inner ring, which in a present embodiment serves as an abutment face during assembly of the various components.

Tapered sleeve 36 presents a tapered outer surface 50 designed to engage tapered inner surface 40 of inner ring 20. The inner surface 52 of the tapered sleeve 36 has a configuration designed to interface with the shaft in application, such as a generally right cylindrical shape in the embodiment shown in FIG. 2. It should be noted that various additional features not specifically illustrated in the figures may be included within the sleeve. For example, slits extending partially are completely through the sleeve may be provided to permit expansion or contraction of the sleeve during tightening or untightening within the assembly. Similarly, such slits may accommodate keys, splines, or other mechanical features used to secure the various elements with respect to one another and to permit transmission of torque in application. The tapered sleeve 36 further includes an externally threaded extension 54 designed to interface with nut 16 as described below.

Figure 3:
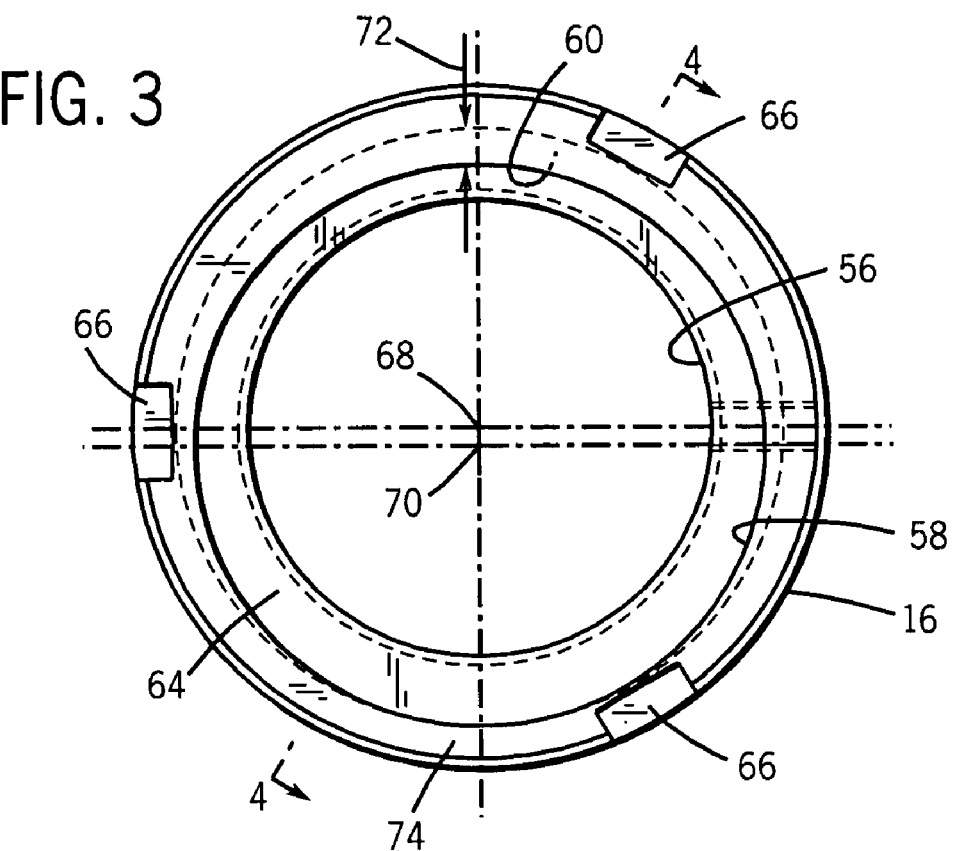
FIG. 3 is an elevational view a locking member or nut as used in the system of FIG. 2, illustrating the eccentric aperture and varying depth groove used for mounting and operating the nut for engagement and disengagement of the system.
Figure 4:
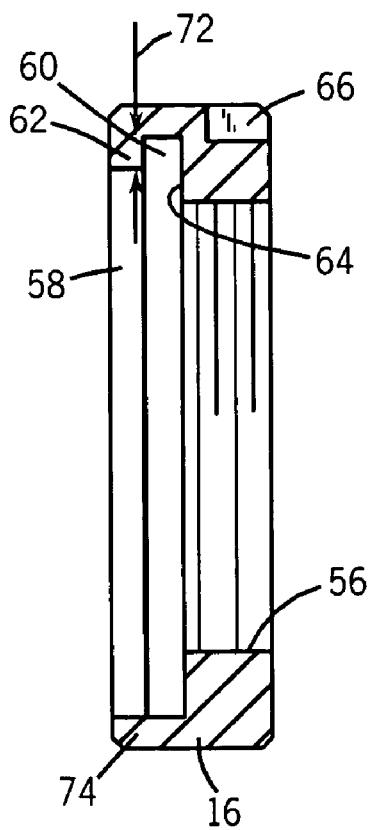
FIG. 4 is a side sectional view of the nut as shown in FIG. 3, illustrating various surfaces and features of the nut.

As best illustrated in FIGS. 2, 3 and 4, nut 16 has a threaded inner surface 56 designed to be engaged on the threaded extension 54 of sleeve 36. An aperture 58 (see, e.g., FIGS. 3 and 4) is formed eccentrically on a front face of nut 16. The aperture forms an opening larger than the diametrical dimension of lip 46 of inner ring 20, such that the nut may be slipped onto the lip 46 during assembly. An internal groove 60 is formed within nut 16 so as to form a radially inwardly projecting lip 62 between the groove 60 and the eccentric aperture 58. Groove 60 is concentric with respect to the general configuration of the nut, and particularly with respect to the threaded inner surface 56. Owing to the concentricity of the groove 60 and the eccentricity of aperture 58, a lip 62 is formed which, like groove 60, has a depth which varies circumferentially around the nut. Groove 60 is bounded on a side opposite lip 62 by an abutment face 64. Finally, tool recesses 66 or similar structures are preferably provided to permit engagement of a tool (not shown) for tightening and loosening the nut in the assembly.

Referring to FIGS. 3 and 4, the threaded inner surface 56 of nut 16, and groove 60, share a central axis 68 which is generally the rotational axis of nut 16. Eccentric aperture 58, on the other hand, has an axis 70 which is displaced from axis 68 so as to form the groove and lip of varying depth. In the illustrated embodiment, the groove 60 and lip 62 have a depth which varies from a maximum depth 72 to a minimal depth 74 at a point diametrically opposed to depth 72. In the illustrated embodiment, at the point of minimum depth 74, the groove 60 is substantially flush with eccentric aperture 58. Various other configurations can, of course, be provided at which the minimum depth does not vary down to the point at which the groove and aperture are flush with one another. As noted above, and referring again to FIG. 2, the illustrated configuration of nut 16 permits the nut to be installed on the inner ring 20 and engaged on the threaded extension 54 of sleeve 36. In particular, because the eccentric aperture 58 is larger in dimension than the lip 46 of the inner ring 20, with the bearing assembly, shaft and tapered sleeve positioned loosely with respect to one another, the nut can be placed over the lip 46 and centered on the tapered sleeve. The tapered sleeve is then drawn outwardly into engagement with the nut, and the nut is threaded onto the sleeve to draw the sleeve into tight engagement between the inner ring 20 and the shaft.

Interaction of various surfaces of the nut and inner ring 20 are best illustrated in FIG. 5. As shown in FIG. 5, as nut 16 is rotated during assembly of the system, abutment face 64 of the nut contacts the distal face 48 of the inner ring to maintain the inner ring generally in its position, while drawing the sleeve into tight engagement between the inner ring and the shaft (see, e.g., FIG. 2). In an alternative embodiment, the lip formed on the nut can be engaged on a corresponding surface of the inner ring. However, in the present embodiment, full engagement of the distal face of the inner ring and the abutment face of the nut is preferred to force tight engagement of the sleeve within the inner ring.

Disassembly of the tapered sleeve from the inner ring is effected by counterrotation of the nut. In the detail view illustrated in FIG. 5, the outer surface 76 of the varying depth lip formed on the nut engages an inner surface 78 of lip 46 of the inner ring. Although the two surfaces do not engage fully over 360°, it has been found that excellent force distribution can be obtained to cause release of the tapered sleeve from the shaft and inner ring. Again, the nut is maintained centered by engagement on the threaded extension 54 of the sleeve. Following the initial release of the sleeve and inner ring, the system can be fully disassembled by disengagement of the nut from the tapered sleeve, and removal of the inner ring, tapered sleeve, and shaft from one another.

Figure 6:
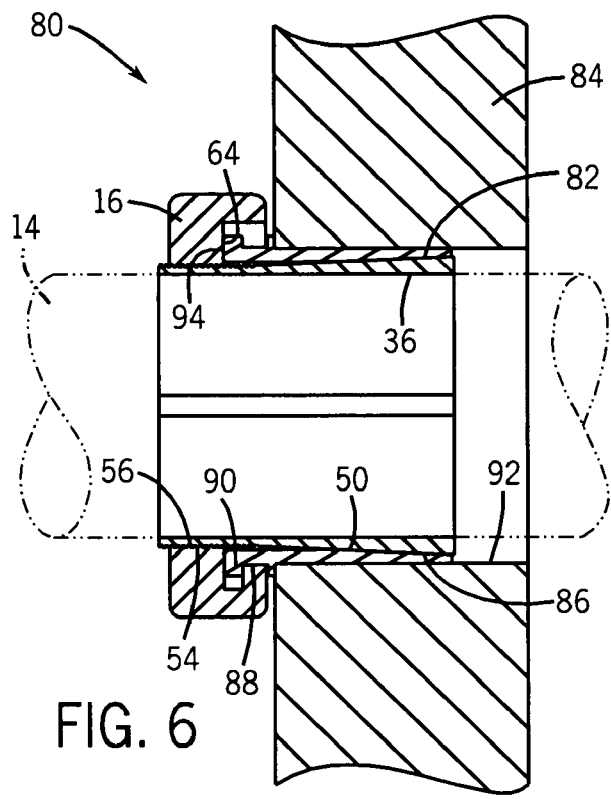
FIG. 6 is a sectional view of a mounting system in accordance with aspects of the present technique, illustrated as installed between a shaft and an outer member having a cylindrical inner surface.

Referring to FIG. 6, a mounting system 80 is illustrated generally for securing a mechanical member within a hollow member. System 80 employs two tapered sleeves 36 and 82 in contrast to system 10 where a single tapered sleeve 36 is used. Thus, as explained below, a hollow member having a non-tapered inner surface may be used, which may allow, for example, use of hollow members that are less expensive and more readily available. To permit use of a non-tapered hollow member, an interface is formed between the tapered surfaces of each sleeve 36 and 82. This leaves the non-tapered inner surface 52 of the inner sleeve 36 to mount against the shaft 14, as in system 10 (see FIGS. 1-5 and associated text), and the non-tapered surface of the outer sleeve 82 to mount against the non-tapered (i.e., cylindrical) inner surface of the hollow member. Thus, again, the hollow member of system 80 need not have a tapered inner surface, but may have a cylindrical bore, for example.

In general, in the application illustrated in FIG. 6, the hollow member is an outer member 84, such as a mounting hub, fan hub, sheave hub, bearing assembly, and so forth, secured on a shaft 14. As similarly discussed above for system 10, many such applications may exist, for example, in rotating machinery, power transmission, and non-rotating applications. In this example, the outer member 84 supports the shaft 14 in rotation. Moreover, while a shaft is shown and described herein, various types of mechanical elements may be employed with the present system, such as inner hubs, various support extensions, gearing, pinions, and so forth. Also, as will be appreciated by those skilled in the art, outer member 84 may be mounted within one of a variety of housing styles depending upon the mechanical configuration of the application, the anticipated loading, and so forth. The particular configurations of the outer member 84 facilitate its operation and interfacing with mounting structures.

As for the interface of tapered surfaces of mounting system 80, the tapered inner surface 86 of the outer sleeve 82 is inclined in a converging direction from right to left in the embodiment illustrated in FIG. 6, and the inner sleeve 36 presents a tapered outer surface 50 designed to engage the tapered inner surface 86 of the outer sleeve 82. Further, the nut 16 of system 10 is utilized in system 80, and similarly secures the outer member 84 and shaft 14 with respect to one another, while permitting straightforward assembly and disassembly of the system with minimal strain and unwanted loading to the bearing, shaft, and associated components. An outer annular groove 88 and first lip 90 of the tapered outer sleeve 82 engage the nut 16. Additionally, as explained above for system 10, the tapered inner sleeve 36 includes an externally threaded extension 54 designed to interface with nut 16 (see also FIGS. 2 and 5 and associated text).

As the nut 16 is rotated (i.e., via tool recesses 66 shown in FIGS. 3 and 4) and tightened to lock the assembly, the outer surface of the tapered outer sleeve 82 tightly engages the inner surface 92 (bore) of the shaft 14. A distal or end face 94 of the tapered outer sleeve 82, which lies adjacent to the lip 90, serves as an abutment face during assembly of the various components. More detail of the tapered outer sleeve 82 is illustrated in FIGS. 7 and 8.

Figure 7:
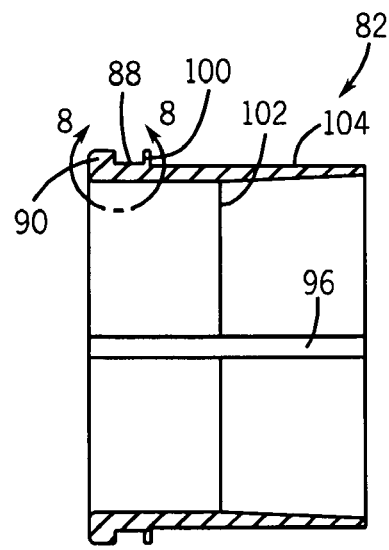
FIG. 7 is a sectional view of the tapered outer sleeve as shown in FIG. 6, illustrating various surfaces and features of the tapered outer sleeve.

In the illustrated example of FIG. 7, one or more slits 96 extend through the outer sleeve 82 to permit expansion or contraction of the outer sleeve 82 during tightening or untightening within the assembly. The outer annular groove 88 (bounded by the first lip 90) is contained on an extension 98 of the outer sleeve 82. The extension 98 also comprises a second lip 100 that prevents movement of the nut 16 into the outer member 84. Also shown in FIG. 7 is the point of the taper start 102 of the outer sleeve 82. As previously indicated, for the tapered (inner) surface 86 of the outer sleeve, the exemplary taper diverges from left to right (see also FIG. 6). Also as discussed, the outer surface 104 of the outer sleeve 82 engages the cylindrical inner surface 92 of the outer member 84.

Figure 8:
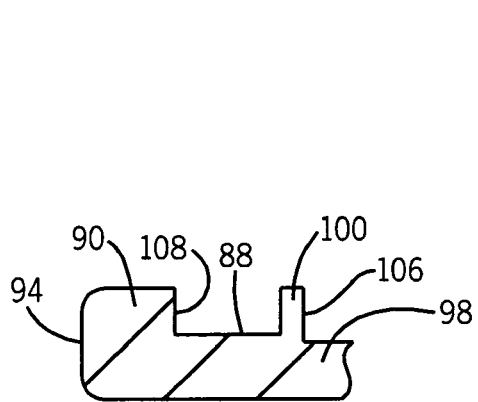
FIG. 8 is a detail view of various surfaces and lips of the tapered outer sleeve which engage the nut and outer member as illustrated in FIG. 6.

FIG. 8 provides an expanded view of the extension 98 having surfaces involved in the tightening and loosening of the nut 16 in mounting system 80. When tightening the nut, the nut is rotated and the abutment face 64 (see FIG. 6) of the nut 16 bears against the distal face 94 of the outer sleeve 82 to draw inner sleeve 36 into the outer sleeve 82. Further, as indicated with the second lip 100 mentioned above, a stop face 106 prevents the outer sleeve 82 from penetrating into the outer member 84. To loosen and remove the nut 16, the nut 16 is counter rotated and the lip 62 (see FIG. 4) bears against lip face 108 (on the first lip 90 of the outer sleeve 82) to resist force of the threads 54 and 56 pushing the inner sleeve 36 out of the outer sleeve 82. It should be noted that the nut 16 arrangement with outer sleeve 82 of system 80 shares some similarity to that with the inner ring 20 of system 10.

For example, the configuration of nut 16 permits the nut to be installed on the outer sleeve 82 (as with the inner ring 20) and engaged on the threaded extension 54 of the inner sleeve 36. This is possible, in part, because the eccentric aperture 58 is larger in dimension than the lip 90 of the outer sleeve 82. Further, with the outer member 84, shaft, and inner and outer sleeves positioned loosely with respect to one another, the nut can be placed over the lip 90 and centered on the inner sleeve. The inner sleeve is then drawn outwardly into engagement with the nut, and the nut is threaded onto the inner sleeve to draw the inner sleeve into tight engagement between the outer sleeve and the shaft.

Disassembly of the inner sleeve from the outer sleeve is effected by counterrotation of the nut. The outer surface 76 of the varying depth lip formed on the nut engages an inner surface 78 of first lip 90 of the outer sleeve 82 to cause release of the inner sleeve from the shaft and outer sleeve. As in system 10, the nut is maintained centered by engagement on the threaded extension 54 of the inner sleeve. Following the initial release of the inner and outer sleeves, the system 80 can be fully disassembled by disengagement of the nut from the inner sleeve, and removal of the inner and outer sleeves, shaft, and outer member from one another.

Figure 9:
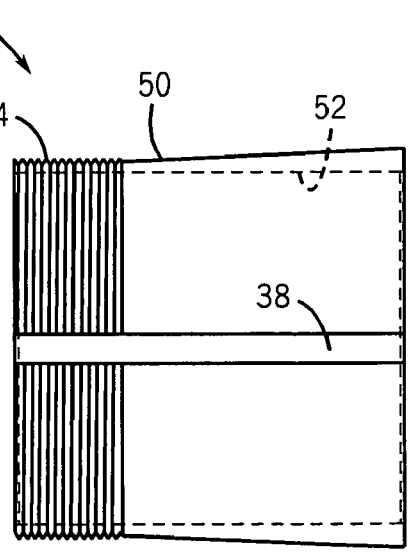
FIG. 9 is a sectional view of the tapered inner sleeve used in both of the mounting systems illustrated in FIGS. 2 and 6.

FIG. 9 illustrates the tapered inner sleeve 36 that may be used in both of the mounting systems 10 and 80 illustrated in FIGS. 1 and 6, respectively. The inner surface 52 of the tapered (inner) sleeve 36 has a configuration designed to interface with the shaft in application, such as a generally right cylindrical shape in the embodiment shown in FIG. 6. As with system 10, various additional features not specifically illustrated in the figures may be included within the inner sleeve 36 in mounting system 80. For example, keys, splines, or other mechanical features used to secure the various elements with respect to one another and to permit transmission of torque in application. As discussed, the externally threaded extension 54 of the inner sleeve 36 engages the threaded inner surface (see FIG. 2) of the nut 16. (In one example, a set screw in the nut is loosened prior to rotating the nut on the inner sleeve). Also, the tapered outer surface 50 engages the inner surface 92 (see FIG. 6) of the outer member 84. Finally, the inner surface 52 engages the shaft 14.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system for securing a shaft within a hollow member, comprising:
    a sleeve having an tapered outer surface configured to interface with a tapered inner surface of a hollow outer member, the hollow outer member having a generally cylindrical extension and a concentric lip formed on the extension,
    wherein the sleeve has an inner surface configured to interface with a shaft, and a threaded extension; and
    a locking member having a threaded inner section configured to mate with the threaded extension of the sleeve, and an eccentric aperture forming a varying depth inner groove configured to mate with the concentric lip of the hollow outer member.

2. The system of claim 1, wherein the concentric lip of the hollow outer member is defined by an annular groove formed within the extension.

3. The system of claim 2, wherein the locking member abuts a distal face of the hollow outer member for engagement with the threaded extension of the sleeve for drawing the sleeve into engagement between the hollow outer member and the shaft.

4. The system of claim 3, wherein a lateral wall of the inner groove of the locking member abuts the lip of the hollow outer member to urge the sleeve out of engagement with the hollow outer member and the shaft.

5. The system of claim 1, wherein the hollow outer member comprises an inner ring of a bearing assembly.

6. The system of claim 1, wherein the eccentric aperture of the locking member is of larger diameter than an outer diameter of the lip of the hollow outer member.

7. The system of claim 6, wherein the groove formed by the eccentric aperture of the locking member varies in depth from a maximal depth to substantially flush with the central aperture.

8. The system of claim 1, wherein the locking member is centered with respect to the hollow outer member by threaded engagement with the sleeve.

9. A system for securing a shaft within a hollow member, comprising:
    an outer sleeve having an tapered inner surface, a generally cylindrical extension, a first concentric lip formed on the extension, a second concentric lip formed on the extension, and an outer surface configured to mount against a cylindrical inner surface of the hollow member;
    an inner sleeve having a tapered outer surface configured to interface with the tapered inner surface of the outer sleeve, an inner surface configured to interface with a shaft, and a threaded extension; and
    a locking member having a threaded inner section configured to mate with the threaded extension of the inner sleeve, and an eccentric aperture forming a varying depth inner groove configured to mate with the first concentric lip of the outer sleeve.

10. The system of claim 9, further comprising the hollow member.

11. The system of claim 9, wherein the first concentric lip of the outer sleeve is defined by an annular groove formed within the extension.

12. The system of claim 11, wherein the locking member abuts a distal face of the outer sleeve for engagement with the threaded extension of the inner sleeve for drawing the outer sleeve into engagement with the inner sleeve between the hollow member and the shaft.

13. The system of claim 12, wherein a lateral wall of the inner groove of the locking member abuts the first lip of the outer sleeve to urge the outer sleeve out of engagement with the inner sleeve and hollow member.

14. The system of claim 9, wherein the hollow member comprises a mounting hub.

15. The system of claim 9, wherein the eccentric aperture of the locking member is of larger diameter than an outer diameter of the first lip of the outer sleeve.

16. The system of claim 15, wherein the groove formed by the eccentric aperture of the locking member varies in depth from a maximal depth to substantially flush with the central aperture.

17. The system of claim 9, wherein the second lip inhibits movement of the locking member into the hollow member.

18. A system for assembly and disassembly of an outer member and shaft, the system comprising:
    a shaft;
    an outer member configured for mounting about the shaft;

an outer sleeve having a tapered inner surface, a cylindrical extension, and an annular outer groove forming a first lip and second lip on the extension;

an inner sleeve configured for assembly between the shaft and the outer sleeve, the inner sleeve having a tapered outer surface to interface with the tapered inner surface of the outer sleeve, an inner surface to interface with the shaft, and an externally threaded extension; and a nut having a threaded inner surface for interfacing with the threaded extension of the inner sleeve, and an eccentric aperture forming an inner groove of varying depth for interfacing with the first lip of the outer sleeve.

19. The system of claim 18, wherein the inner groove of the nut forms a lip of varying depth.

20. The system of claim 19, wherein the lip of the nut and the annular outer groove of the outer sleeve are dimensioned to permit a distal face of the outer sleeve to abut the nut during threaded engagement of the inner sleeve and nut for drawing the inner sleeve between the outer sleeve and the shaft.

21. The system of claim 18, wherein a lateral wall of the inner groove of the nut abuts the first lip of the outer sleeve to urge the inner sleeve out of engagement with the outer sleeve and the shaft.

22. The system of claim 18, wherein the eccentric aperture of the nut is of larger diameter than an outer diameter of the first lip of the outer sleeve.

23. The system of claim 22, wherein the inner groove of the nut varies in depth from a maximal depth to substantially flush with the central aperture.

24. The system of claim 18, wherein the nut is centered with respect to the outer sleeve by threaded engagement with the inner sleeve.

25. A method for assembling a hollow member and a shaft, comprising assembling a tapered outer sleeve and a tapered inner sleeve between the hollow member and the shaft, the outer sleeve having a tapered inner surface and a cylindrical extension presenting an annular outer groove forming a first and second concentric lip, the inner sleeve having a tapered outer surface to interface with the tapered inner surface of the outer sleeve, an inner surface to interface with the shaft, and an externally threaded extension;

assembling a locking member on the inner sleeve, the locking member including an inner threaded section to interface with the threaded extension, and an eccentric aperture forming a varying depth groove for receiving the first lip of the outer sleeve; and tightening the locking member on the sleeve to draw the outer sleeve and inner sleeve into engagement between the hollow member and the shaft.

26. The method of claim 25, wherein the eccentric aperture of the locking member is of larger diameter than the first lip of the outer sleeve.

27. The method of claim 25, comprising the further step of tightening a set screw in the locking member to prevent loosening of the locking member.

28. The method of claim 25, wherein as the locking member is tightened on the inner sleeve, the locking member abuts the second lip of the outer sleeve to secure the hollow member with the shaft, wherein a stop face on the second lip restrains the locking member from penetrating the hollow member.

29. The method of claim 28, wherein a body portion of the locking member abuts the outer sleeve for tightening of the locking member on the inner sleeve.

30. A method for disassembling an outer member and shaft, the method comprising:

rotating a locking member on a tapered inner sleeve positioned between a tapered outer sleeve and a shaft, the outer sleeve having a tapered inner surface and a cylindrical extension presenting an annular groove, the inner sleeve having a tapered outer surface interfacing with the tapered inner surface of the outer sleeve, and a threaded extension, the locking member having threaded inner section engaging the threaded outer surface of the inner sleeve, and an eccentric aperture forming a varying depth groove, a side wall of the varying depth groove contacting a side wall of the annular groove of the outer sleeve to force relative displacement of the outer sleeve and the inner sleeve.

31. The method of claim 30, wherein the varying depth groove has a depth varying from a maximal depth to substantially flush with the eccentric aperture.

32. The method of claim 30, further comprising loosening a set screw in the locking member prior to rotating the locking member on the tapered sleeve.

* * * * *